United States Patent Office.

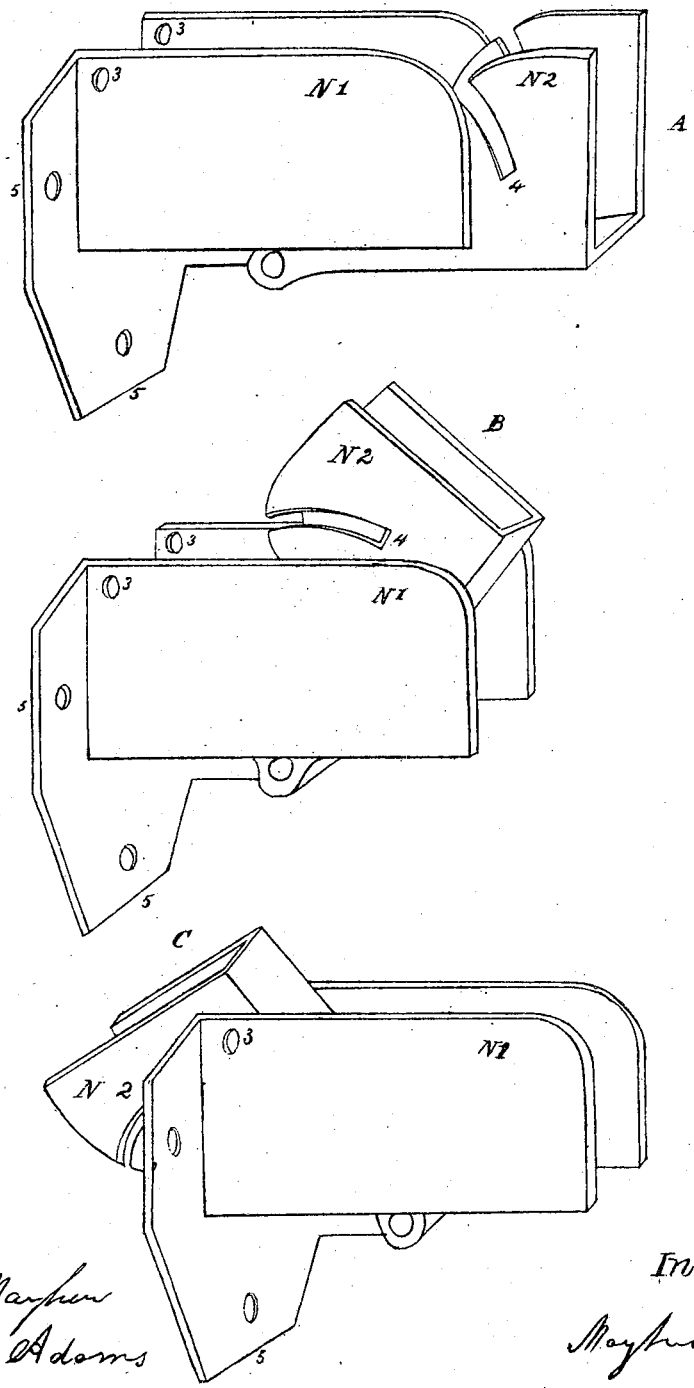

MAYHEW ADAMS, OF CHILMARK, MASSACHUSETTS.

Letters Patent No. 73,484, dated January 21, 1868.

IMPROVED CHOCK FOR WHALE-BOATS.

*The Schedule referred to in these Letters Patent and making part of the same.*

TO ALL WHOM IT MAY CONCERN:

Be it known that I, MAYHEW ADAMS, of Chilmark, in the county of Dukes, State of Massachusetts, have invented a new Pattern for Self-Clearing Chocks to a Whale-Boat, of which the following is a full description.

No. 1 of the drawings is the forward part of the chock, where the line runs through when fast to a whale.

No. 2 is the after-part, and is connected with No. 1 by a hinge, so that when the line gets tangled it brings up against the after-part of No. 2, and raises it up and turns it over, throwing the line clear out of No. 1, thereby preventing the boat from being drawn down, or the necessity of cutting the line.

No. 3 is a hole for the chock-pin, to keep the line in its place.

No. 4 is a place cut in No. 2, to let it shut down over the chock-pin.

No. 5 are places for screws to fasten the chock to the boat.

Letter A shows the first position of the chock. B shows the second position, showing No. 2 in the act of turning. At C is shown the third position, showing No. 2 as it has thrown the line clear of the chock.

What I claim as my invention, and desire to secure by Letters Patent, is—

The construction and use of the chocks, consisting of the parts one and two, operating substantially as and for the purpose specified.

MAYHEW ADAMS.

Witnesses:
JOHN W. MAYHEW,
MARY C. ADAMS.